United States Patent Office 3,215,236
Patented Nov. 2, 1965

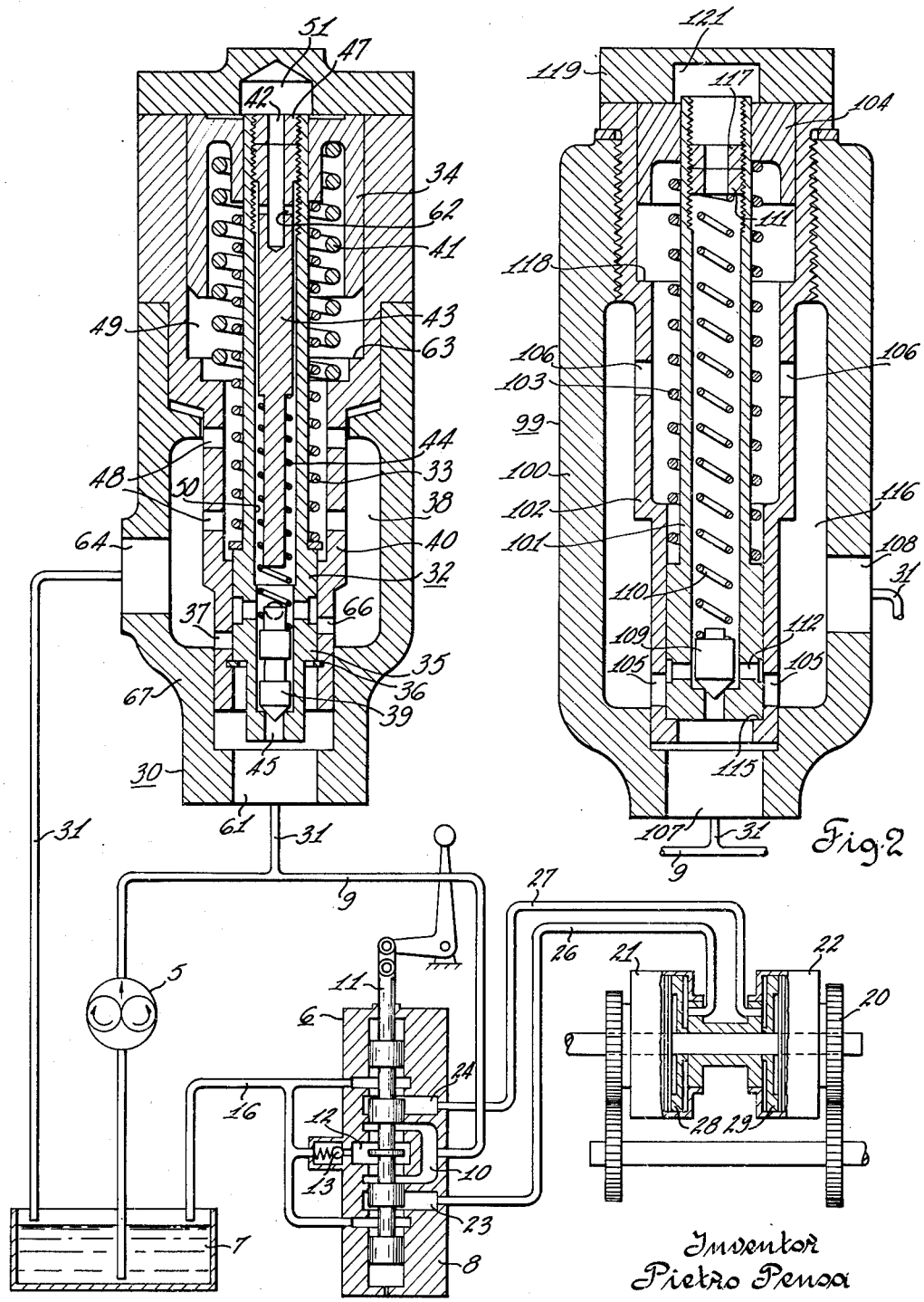

3,215,236
PRESSURE RISE DELAYING VALVE FOR HYDRAULICALLY ACTUATED CLUTCHES
Pietro Pensa, Milan, Italy, assignor to Allis-Chalmers Manufacturing Company, Milwaukee, Wis.
Filed Aug. 1, 1963, Ser. No. 299,402
Claims priority, application Italy, Aug. 4, 1962, 15,725
6 Claims. (Cl. 192—85)

This invention relates to a hydraulic control system for friction clutches and to a pressure rise delaying valve which permits gradual clutch engagement.

Heretofore it has been a common practice to provide hydraulic control systems for clutches for vehicle transmissions and the like. In such control systems, hydraulic fluid such as oil is delivered by a pump to the hydraulic actuator for a clutch upon manual or automatic movement of a control valve from its neutral position to a clutch actuating position. The pressure fluid delivered by the pump to the control valve may be constantly pressurized or it may bypass to reservoir except when the control valve is operated to a clutch actuating position depending on the type of system employed. With either type of system, clutch engagement may be so rapid that undesirable shocks are produced which are harmful to the vehicle power train and other parts and equipment.

It is an object of my invention to provide a pressure regulating valve which has means for delaying the establishment of predetermined maximum relief pressure.

It is a further object of this invention to provide a novel pressure rise delaying valve wherein the biasing of a movable valve member is increased gradually through delaying means thereby gradually increasing the working pressure in the hydraulic line to which the valve is connected.

It is a further object of this invention to provide pressure regulating valve for a hydraulic system which has a movable valve part biased to a closed position by a spring interposed between the valve part and a movable plunger, the latter being gradually moved in a direction compressing the spring by fluid flowing to one end of the plunger from the hydraulic system through a flow restricting means.

It is a further object of this invention to provide an improved hydraulic control system for a hydraulic clutch employing a novel pressure rise delaying valve whereby the pressure in the hydraulic system rises slowly upon operation of the control valve thereby effecting smooth and gradual engagement of the clutch.

It is a further object of this invention to provide a pressure rise delaying valve of the hereinbefore outlined character which includes means for varying time required for the working pressure to reach a predetermined maximum value.

It is a further object of this invention to provide a hydraulic control system for fluid actuated friction clutches employing a main control valve and fluid pump wherein a first pressure regulating valve maintains a predetermined low pressure level when the control valve is in neutral and wherein a second pressure regulating valve with pressure rise delaying means operates to gradually increase the working pressure in the system when the control valve is adjusted to a clutch operating position.

These and other objects and advantages of this invention will be apparent upon reading the following description in conjunction with the drawings in which:

FIG. 1 shows a section view of my pressure rise delaying valve incorporated in a schematically illustrated hydraulic clutch control system; and FIG. 2 is a section view of an alternate construction of my pressure rise delaying valve.

Referring to FIG. 1, the hydraulic control includes a hydraulic pump 5 drawing fluid from a reservoir 7 and delivering fluid to the supply chamber 10 formed in the housing 8 of a control valve 6 through a passage in the form of a supply conduit 9. The supply chamber 10 is in fluid communication with a pressure regulating chamber 12 of the housing 8 when the valve spool 11 is in the neutral position illustrated and in this position the pressure in supply conduit 9 is regulated at a low pressure level such as 36 p.s.i. by a low pressure relief valve 13 interposed between the pressure regulating chamber 12 and the reservoir 7 through return line 16. A pair of hydraulically operated multiple disk friction clutches 21, 22 of a constant mesh transmission 20 are connected to clutch supply ports 23, 24 by branch supply conduits 26, 27.

Upon movement of the flow control element or valve spool 11 to a clutch operating position, wherein either of the clutch supply passages 26, 27 is connected to supply conduit 9 and the other to reservoir 7, the pressure regulating chamber 12 will be isolated from supply conduit 9 and thereupon a pressure regulating valve 30 in a bypass passage 31 establishes the working pressure of the system.

Upon movement of the control valve spool 11 to a clutch engaging position the pressure in supply passage 9 increases sufficiently to move a stepped diameter cylindrical valve member 32 off its snap ring seat 36 against the biasing effect of spring 33 which also acts against a biasing plunger 34. Upon upward movement of valve member 32 off its snap ring seat 36 the large diameter portion 35 exposes opening 37 in holder 40 and fluid from supply conduit 9 will bypass to reservoir 7 through opening 37 and exhaust cavity 38. The increase in pressure in supply conduit 9, and hence against the hydraulic actuators or pistons 28, 29 in the clutches 21, 22, causes a differential pressure operated pilot valve 39 seated in restricted opening 45 of valve member 32 to open, thereby admitting pressure fluid to the top side of chamber 51 in which plunger 34 is disposed. The plunger responds by moving downwardly compressing biasing spring 33 and a separate coil spring 41. This compressing of spring 33 affects a higher working pressure in supply conduit 9 which results in a greater force being exerted against plunger 34 thereby causing it to continue its downward movement at the rate it is supplied fluid through pilot valve 39 which acts as a flow restricting or delaying means. Passages 45, 42 may also be proportioned to afford restriction to fluid flow from the valve inlet 61 to the pressure chamber 51 through the inner bore 50 which acts as a pilot passage. The movement of the one way pilot valve 39 will continue downwardly gradually increasing the pressure established by a spring biased valve member 32 until the working pressure is reached. The maximum working pressure, which may be 180 p.s.i. for instance, is reached when the plunger 34 bottoms on abutment 63.

It will be noted that openings 42, 62 are formed in an adjusting screw 43 for pilot spring 44 acting against the pilot valve 39. A lock nut 47, with an axial hole drilled therethrough, holds screw 43 in its predetermined position of adjustment.

Adjustment of screw 43 to further compress spring 44 will afford greater restriction to flow of fluid past pilot valve 39 and thus will effect a greater time delay in the downward movement of the biasing plunger 34 to its maximum spring compressing or biasing positions. Thus the time required for the working pressure to be established, by the movement of plunger 34 to shoulder 63, is increased by increasing the compression on the pilot valve biasing spring 44. The pilot valve 39 and its adjustable biasing spring 44 may be considered to be adjustable flow restricting means for the passage 50 between the supply conduit 9 and the plunger pressure chamber 51.

When the control valve is returned to neutral the low pressure relief valve 13 in the flow path between passages 9 and 16, established by chambers 10, 12 and spool 11 will permit the pressure in supply passage 9 to drop to 36 p.s.i. and at such pressure the valve member 35 will return to its closed position, as illustrated. In this position a bleed hole 66 permits fluid to escape from pressure chamber 51. In the illustrated neutral position of flow control element 11, the clutch supply passages 26, 27 are connected to return passage means 16 by flow paths through the control valve 6 which are independent of the flow path in which valve 13 is employed.

Holes 48 place spring chamber 49 on the bottom side of plunger 34 in fluid communication with the reservoir through exhaust chamber 38, outlet 64 in housing 67 and the portion of bypass passage 31 connected to reservoir.

By placing the pressure rise delaying valve 30 between the main supply passage 9 and reservoir, only one delaying valve is required for a plurality of clutches. The low pressure relief valve in maintaining a low pressure level in the supply passage aids in preventing air from being present in the system thus insuring proper clutch actuation. The pressure rise delaying valve 30 has been found to effectively reduce shocks which would otherwise be imposed on the power train in which the clutches 21, 22 are used. Jerky gear shifting is disturbing to the vehicle operator and often damaging to other vehicle parts and equipment. The gradual and smooth clutch engagement afforded by the control system illustrated and described improves operation of the produce in which used, reduces parts failures and provides a superior and more marketable product.

A second embodiment of my invention is shown in FIG. 2. The pressure rise delaying valve 99 includes a housing 100 in which a cylindrical casing 102 is screwed and a reciprocable valve member 101 the large diameter portion of which is held against a seat 115 by a spring 103 which also reacts on an annular plunger 104. Holes 105 for the outlet of the oil and holes 106 for keeping the inner spring chamber discharged, are drilled in the containing casing 102. Upon shifting the control valve spool to clutch engaging position oil delivered by the pump to the inlet 107 through supply passage 9 and bypass passage 31 will move valve member 101 upwardly and oil will discharge through outlet 108 by way of low pressure chamber 116 and thence will flow to reservoir through the portion of bypass passage 31 connected thereto.

Inside hollow valve member 101 there is arranged a pilot valve 109 held against its seat by a spring 110 the upper end of which reacts against adjusting nut 111. Lock nut 117 maintains the adjusting nut 111 in its selected position of adjustment.

The operation of valve 99 is as follows: When the oil in the supply passage 9 is put under pressure, it pushes the valve member 101 until a certain area of holes 105 is uncovered. In this manner, the oil pressure would be stabilized at a low, predetermined value, governed by the tension of spring 103. However, the oil passing by pilot valve 109 flows through the interior of valve member 101 and urges plunger 104 downwardly. The force of spring 103 thus changes since the spring 103 is further compressed, and it slightly lowers valve member 101 thereby reducing the aperture of holes 105 and consequently increasing the working pressure in passage 9. This increased pressure on passing through pilot valve 109 causes a further lowering of plunger 104, and the phenomenon hereinbefore described is repeated in a continuous manner until plunger 104 abuts a shoulder 118 of cylindrical casing 102. At this point, the final pressure condition is stabilized and the desired working pressure is established. It is manifest that if nut 111 is used to adjust the tension of spring 110 and hence change the flow of oil through pilot valve 109, the phenomenon will take place in a longer or shorter time, thus bringing the fluid in supply passage 9 to full working pressure in a shorter or longer time.

On return of the control valve to neutral, the spring 103 pushes valve 101 back against its seat 115 and so places holes 112 in communication with holes 105 so that the oil in pressure chamber 121 acting downwardly on plunger 104 is discharged and the plunger 104 itself returns upwardly to its abutting position against cap 119, thus restoring the starting conditions.

The effective pressure area of plunger 104, that is its upper end face area, is greater than the effective pressure area of the bottom end of the enlarged portion of valve member 101. It will be noted that the effective pressure area of valve member 101, during operation of the delay valve 99, is the area of the circle defined by the diameter of the enlarged portion of valve member 101 less the area of the circle defined by the diameter of the reduced portion of valve member 101 which extends through plunger 104.

Although only two embodiments of my invention have been illustrated and described, it is intended that my invention shall include such structures as come within the scope of the appended claims.

The embodiments of the invention in which an exclusive property or privilege is claimed are defined as follows:

1. The combination comprising: a friction clutch including a hydraulic actuator; a supply passage connected to said actuator; and a device for regulating the time required to reach a pressure of predetermined value in said supply passage including a housing having a pressure chamber, an inlet connected to said supply passage, an outlet adapted for connection to a reservoir and a valve seat intermediate said inlet and outlet, a movable valve member having a closed position when seated on said seat, a plunger reciprocably mounted in said pressure chamber, a biasing spring interposed between said plunger and said movable valve member, and flow restricting means between said supply passage and said pressure chamber including a biased one way pilot valve moving from a closed position to an open position upon the pressure in said supply passage exceeding the pressure in said pressure chamber by a predetermined value, said pilot valve preventing flow through said flow restricting means in the direction from said pressure chamber to said supply passage.

2. The structure set forth in claim 1, wherein said flow restricting means includes a spring urging said pilot valve toward its closed position and an adjustable abutment for said spring for selectively varying the tension thereof.

3. The combination comprising: a hydraulically actuated friction clutch; a hydraulic system having a high pressure side connected to said clutch and having a low pressure side; and a pressure rise delaying valve including a housing having an inlet connected to said high pressure side of said hydraulic system, an outlet adapted for connection to said low pressure side of said hydraulic system, walls defining a pressure chamber and a seat intermediate said inlet and outlet; a movable valve member having a large diameter portion at one end thereof seated on said seat, a small diameter portion at its opposite end and an interior passage extending axially therethrough with one end in fluid communication with said pressure chamber; an annular plunger in said pressure chamber coaxially disposed in sliding fit engagement on said small diameter portion of said valve member, the effective pressure area of said plunger being greater than the effective pressure area of the enlarged cylindrical portion of said valve member; a spring interposed between said plunger and said valve member and biasing said plunger and valve member in opposite directions; a pilot valve interposed in flow blocking relation to said interior passage and a pilot valve spring biasing said pilot valve toward a closed position in which fluid is prevented from flowing from said inlet to said pressure chamber, said pilot valve opening upon the pressure in said inlet exceeding the pressure in said pressure chamber by a predetermined value and said pilot valve preventing fluid flow through said interior passage in the direction from said pressure chamber to said inlet.

4. The structure set forth in claim 3 and further comprising means for selectively adjusting the biasing effect of said pilot valve spring.

5. The combination comprising: a hydraulically actuated clutch, a source of pressure fluid including a pump and reservoir, a control valve for controlling flow of fluid to and from said clutch including a shiftable flow control element, a supply passage between said pump and said control valve, a clutch passage between said valve and said clutch, return passage means between said control valve and said reservoir, means providing a first flow path through said valve from said supply passage to said return passage means when said valve is in its neutral position, means providing a second flow path through said control valve between said clutch passage and said return passage means when said control valve is in its neutral position, a low pressure relief valve in said first flow path maintaining the pressure in said supply passage at a predetermined value when said clutch is not hydraulically actuated, said second flow path being independent of said low ressure relief valve, a bypass passage between said supply passage and said reservoir and a pressure rise delaying valve in said bypass passage including a housing having an inlet, an outlet and a pressure chamber, a valve member having a fluid blocking position disposed between said inlet and outlet, a biasing plunger in said chamber, a spring acting in opposite directions against and interposed between said valve member and plunger, a pilot passage between said supply passage and the portion of said chamber remote from said spring and restricting means for impeding flow through said pilot passage.

6. The structure set forth in claim 5 and further comprising means for adjusting said restricting means to selectively vary the flow rate therethrough.

References Cited by the Examiner
UNITED STATES PATENTS

| | | | |
|---|---|---|---|
| 2,807,968 | 10/57 | Forster | 192—109 |
| 2,869,701 | 1/59 | Yokel | 192—109 |
| 2,870,781 | 1/59 | Tennis | 137—489.5 X |
| 2,907,428 | 10/59 | Erwin et al. | 192—85 X |
| 2,935,999 | 5/60 | Hock et al. | 192—85 X |
| 2,939,557 | 6/60 | Dabich et al. | 192—85 X |
| 3,042,165 | 7/62 | Yokel | 192—85 |

DON A. WAITE, *Primary Examiner.*

DAVID J. WILLIAMOWSKY, *Examiner.*